United States Patent
Arcaini et al.

(10) Patent No.: US 7,822,273 B1
(45) Date of Patent: Oct. 26, 2010

(54) METHOD AND APPARATUS FOR AUTOMATIC CORROSION DETECTION VIA VIDEO CAPTURE

(76) Inventors: Gianni Arcaini, 6622 Southpoint Dr. South Suite 310, Jacksonville, FL (US) 32216; Aydin Arpa, 6622 Southpoint Dr. South Suite 310, Jacksonville, FL (US) 32216; Yanhua Ruan, 6622 Southpoint Dr. South Suite 310, Jacksonville, FL (US) 32216; Prem Kuchi, 6622 Southpoint Dr. South, Jacksonville, FL (US) 32216

( * ) Notice: Subject to any disclaimer, the term of this patent is extended or adjusted under 35 U.S.C. 154(b) by 832 days.

(21) Appl. No.: 11/804,001

(22) Filed: May 16, 2007

(51) Int. Cl.
*G06K 9/00* (2006.01)
(52) U.S. Cl. .................. 382/168; 382/162; 382/167; 382/274; 382/305
(58) Field of Classification Search .............. 382/162, 382/164, 165, 166, 167, 274, 305; 348/81, 348/82, 83, 84; 356/241.1
See application file for complete search history.

(56) References Cited

U.S. PATENT DOCUMENTS

| | | | |
|---|---|---|---|
| 5,206,640 A | 4/1993 | Hirvonen et al. | |
| 5,646,400 A | 7/1997 | Perez et al. | |
| 5,956,077 A * | 9/1999 | Qureshi et al. | 348/82 |
| 6,363,788 B1 | 4/2002 | Gorman et al. | |
| 6,367,328 B1 | 4/2002 | Gorman et al. | |
| 6,495,833 B1 | 12/2002 | Alfano et al. | |
| 6,595,059 B2 | 7/2003 | Gorman et al. | |
| 6,595,061 B2 | 7/2003 | Gorman et al. | |
| 6,960,288 B2 | 11/2005 | Marchal et al. | |
| 7,283,654 B2 * | 10/2007 | McLain | 382/128 |
| 7,532,320 B2 * | 5/2009 | Neiss et al. | 356/301 |
| 2005/0151841 A1 * | 7/2005 | Nelson et al. | 348/82 |
| 2010/0062422 A1 * | 3/2010 | Ausserre | 435/6 |

* cited by examiner

*Primary Examiner*—Samir A. Ahmed
*Assistant Examiner*—Ali Bayat
(74) *Attorney, Agent, or Firm*—Lawrence J. Gibney, Jr.

(57) ABSTRACT

In order to prevent human injury during the inspection of tanks carrying caustic material this device has been created which will allow a tank to be inspected remotely. A camera is used to take an image of the tank surface and software is incorporated into the method that will analyze the surface of the tank for certain corrosion characteristics. This data is complied in an easily readable for the operator.

12 Claims, 3 Drawing Sheets

METHOD AND APPARATUS FOR AUTOMATIC CORROSION DETECTION VIA VIDEO CAPTURE

BACKGROUND OF THE INVENTION

A. Field of the Invention

This relates to detecting areas of corrosion on vessels or containers, particularly vessels and containers that carry caustic or harmful materials.

B. Prior Art

There are many other prior art references to the testing of tanks and containers with regard to areas of corrosion and all types of corrosion.

One of them may be found at Marchal, U.S. Pat. No. 6,960,288, which is a method and device for detecting microbiologically induced corrosion. This reference uses an electrode through which an electrical current is passed to detect the presence of corrosion. It does not use a camera.

Another method to nondestructively test for or detect material abnormalities beneath a coated surface can be found at Alfano, U.S. Pat. No. 6,853,926. The Alfano reference uses a light source to detect infrared rays.

Still other patents test for corrosion using ultrasonic waves such as found at Gorman, U.S. Pat. No. 6,595,061 Gorman, U.S. Pat. No. 6,595,059 and Gorman, U.S. Pat. No. 6,363, 788. All three Gorman references use ultrasonic waves to detect the presence of corrosion. None of the Gorman references use a color camera or compile the information using a histogram.

Other patents related to the nondestructive detection of steel surfaces include Perez, U.S. Pat. No. 5,646,400, which uses an embedded optical fiber. Light is transmitted through the embedded fiber and analysis of the refracted light alerts the operator to the presence of possible areas of corrosion.

With the current method and apparatus a color camera is used to take a video image of the surface of the container. This image is integrated into software, which tests for certain surface characteristics on the tank lining or exterior surface to detect the presence of corrosion. This method can be used to test for any type of corrosion and does not use ultrasonic waves or the other means to test that is found in the prior art.

BRIEF SUMMARY OF THE INVENTION

This is a method and apparatus by which corrosion on tanks and tank liners can be detected remotely and safely with minimal involvement from humans. Corrosion needs to be detected as early as possible and should be corrected in a timely fashion. This is particularly true with any caustic material, which produces corrosion but is also harmful to humans.

Containers and other vessels carrying caustic materials are often transported by truck or train. Some of these materials are extremely caustic to humans and can even prove to be deadly. Caustic material in addition to potentially being harmful to humans produces corrosion on tanks, particularly metal tanks. Most of the vessels that are used to transport the material are made from metals such as steel. It is important for maintenance purposes as well as the general safety of the worker and the public to detect corrosion quickly so that appropriate remedial action can be taken.

This method and apparatus uses a color camera to take a color image of the tank surface and compile a histogram of the surface orientation of the tank. Several surface characteristics or parameters of the tank surface are measured and these characteristics, which indicate the presence of corrosion are put into a histogram. The histogram provides a format by which the area of the tank's surface can be analyzed in a readable form.

For instance, an area of corrosion will typically have a different surface color. The software will discriminate between the different surface colors of the tank and will differentiate between healthy color and healthy lining surfaces and areas of corrosion. The information about the discoloration of the tank surface is incorporated into the histogram.

Areas of corrosion may also have jagged edges or slightly irregular shapes. These characteristics of the surface tank lining are also measured and this information is incorporated into the histogram. The software that is used is capable of analyzing the general surface contour of the tank lining and determine whether or not the area is an area of corrosion or simply surface irregularities of the vessel.

The information, once it is compiled, can then be transmitted and viewed by the human operator in a readable format in a remote facility to minimize the risk of injury to humans.

DETAILED DESCRIPTION OF THE EMBODIMENTS

Figure 1:
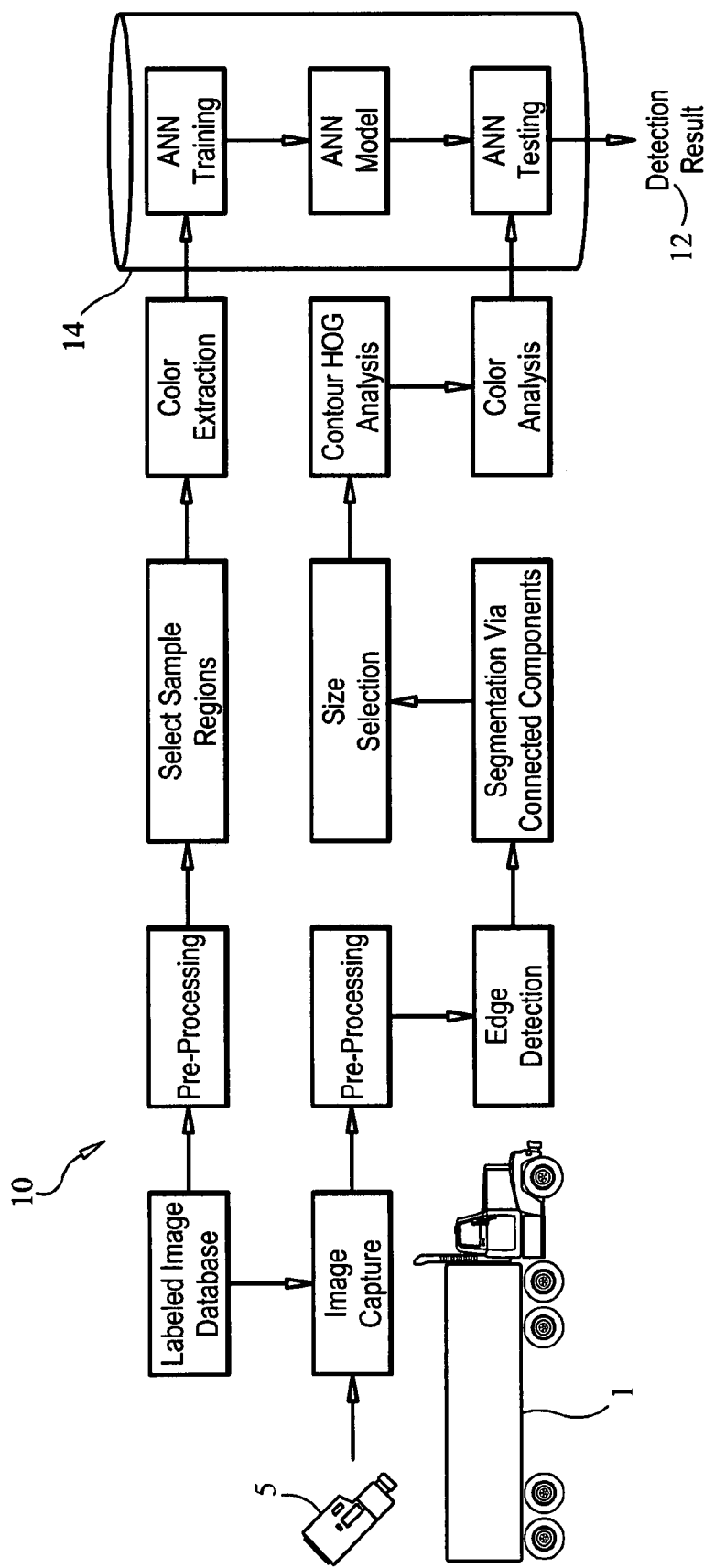
FIG. 1 is a schematic view of the components of the method and apparatus.

This is a method and apparatus for detection of corrosion in linings of tanks, particularly tanks, which carry caustic materials. The specific method and apparatus can be used on a variety of different tanks.

One of the principal problems with the inspection of tanks that carry caustic material is that the caustic material may be harmful to humans. Exposure to a caustic material needs to be avoided if at all possible to prevent personal injury. A representative example of a caustic material that is transported in a tank is sodium hydroxide, which is extremely caustic if contact with human skin occurs.

This particular method will use a color camera 5, which will visually inspect the exterior lining of a surface as the tanker 1 moves through a particular portal or point of reference. More than one camera may be used to obtain multiple views of the tank. The camera 5 is likely to be mounted on a truss or frame structure (not depicted) and will be mounted to provide maximum exposure to insure adequate capture of the tank surface as it passes through the portal.

A color image of the tank's surface will be taken, and certain parameters of the surface lining or the surface tank will be viewed and analyzed by software 10, which has been incorporated into this method. Certain presets are incorporated into the software in order for the software to distinguish between various tank characteristics and areas of possible concern based on certain parameters. Once the camera image has been analyzed by the software the system will produce a detection result 12. This detection result 12 will be incorporated into a histogram, which is a graphical display of tabulated frequencies.

The parameters or surface characteristics, which are analyzed include the shape, size and color of a particular tank surface area that has been previously captured by the camera 5 and analyzed by the software 10. The software analyzes this information and places the information on a histogram, which is a compilation of data in a readable linear form. The software 10 will produce a linear representation of the tank surface and these linear representations are illustrated by the histograms in FIGS. 2A through 2D.

The shape of a particular area is analyzed and displayed by using a modification to the Histogram of Oriented Gradients (HOG) method. In this method the histograms of the parameters—shape, size and color—or gradients are weighted equally.

Another parameter that is examined is the size of an area. Pixel orientation is taken of the tank lining, and the size variations of certain preset values determine the possible presence of corrosion in a tank lining. The size of the area is depicted on the histogram and represented by the spike.

The color of the area of the tank surface is also analyzed. An area of corrosion will generally have a brown or reddish color and this data is analyzed by the software and put into the histogram. In the software the system will employ a three layer Artificial Neural Network (ANN) 14 to classify the color information. The ANN information can be saved and viewed as a text file.

The histograms can be viewed at a remote location to determine if possible areas of corrosion exist and the probable severity of the corrosion. This will enable personnel to make decisions related to tank maintenance and/or replacement without physically needing to approach the tank.

Figure 2A:
FIG. 2A is a sample histogram of oriented gradient (HOG) depicting the area of a healthy tank liner surface.
Figure 2B:
FIG. 2B is a sample histogram of oriented gradient (HOG) depicting the area of a healthy tank liner surface.
Figure 2C:
FIG. 2C is a sample histogram of oriented gradient (HOG) depicting the area of a possible corroded tank liner surface.
Figure 2D:
FIG. 2D is a sample histogram of oriented gradient (HOG) depicting the area of a possible corroded tank liner surface.

FIGS. 2A and 2B are representative histograms which depict relatively normal tank surfaces. The spikes that are found on FIGS. 2A and 2B are likely to be airborne contaminants such as dust or normal structural edges to the tank. Conversely the multiple areas of spikes that are found on FIGS. 2C and 2D are indicative of possible areas of corrosion and should alert personnel to take corrective action.

Figure 4A:
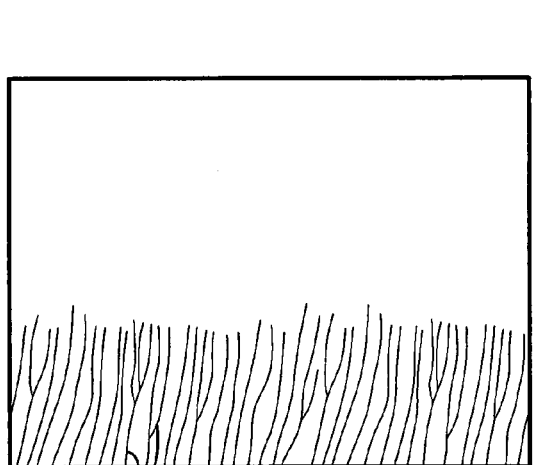
FIG. 4A is a representation of a healthy tank liner.
Figure 4B:
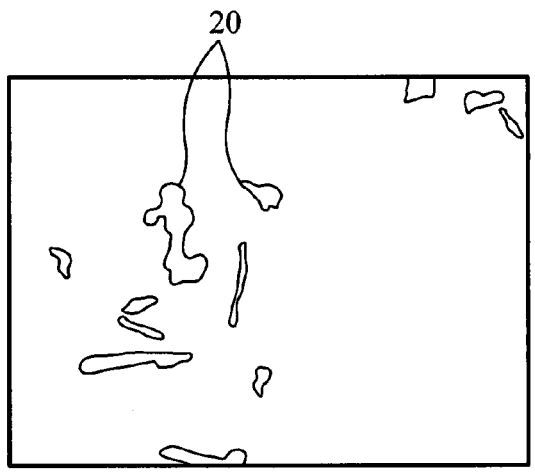
FIG. 4B is a representation of areas of corrosion on a tank liner.

Areas of corrosion 20 typically are jagged and may be widespread or spotted throughout the tank lining, which would indicate the possible presence of corrosion such as depicted in FIG. 4B. The software is able to discriminate between a healthy tank lining such as depicted in FIG. 4A and areas of corrosion based on surface irregularity such as depicted in FIG. 4B. These grid locations such as represented by FIGS. 4A and 4B can be viewed remotely.

The software 10 that is employed will have certain presets so that areas of corrosion will only be indicated when these preset values are exceeded.

Figure 3:
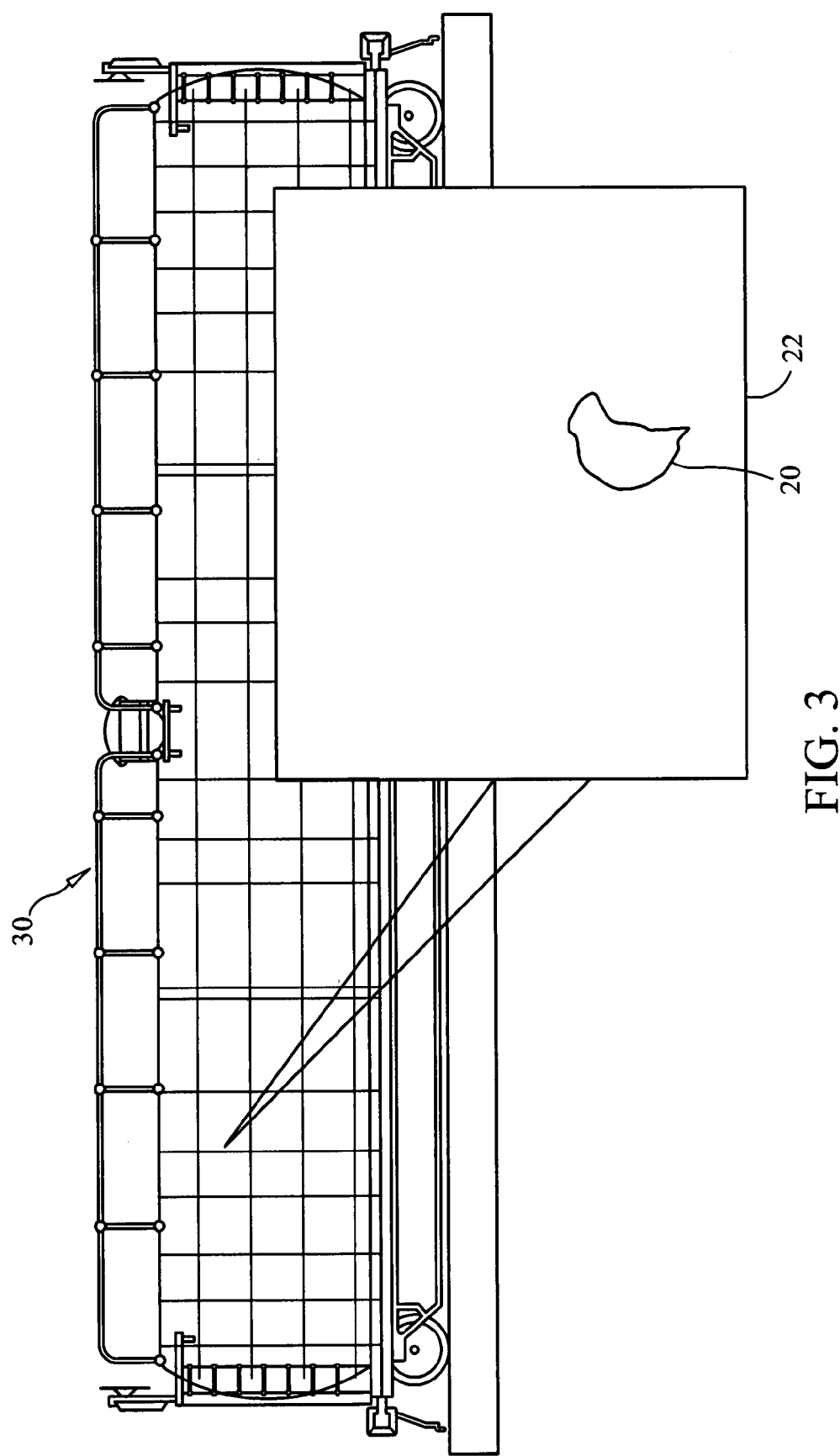
FIG. 3 is a view of the grid overlay on the tanker and a sample section of an area of possible corrosion.

The camera that is used in this system is a color camera. The camera will produce an image superimposed on a grid overlay 30 such as depicted in FIG. 3. Individual grid locations are also represented by FIGS. 4A and 4B. The use of a grid overlay 30 allows the operator to pinpoint the specific location on a specific area 22 on a tank where possible areas of corrosion 20 exist. The grid overlay 30 and individual grid sections 22 can be viewed remotely.

The images, which are produced, can also be tagged for appropriate corrective action, depending upon certain preset determining factors. All information may be stored in a database for later retrieval.

The inventors claim:

1. An apparatus for automatic corrosion and detection via video capture, which is comprised of:
   a. a camera;
   wherein the camera is mounted on a portal;
   wherein the camera captures images of a tank surface as it passes through a portal;
   wherein the images are displayed at a remote facility;
   b. software;
   wherein software is provided;
   said software is provided with a list of preset characteristics for corrosion;
   wherein the software analyzes certain surface characteristics of the tank surface provided by the camera images;
   said software produces a detection result;
   c. a histogram;
   wherein a histogram is compiled from the analysis that is performed by the video image and the software;
   said histogram presents the tank liner characteristics in a linear format;
   wherein the histogram is viewed by an operator at a remote facility;
   d. grid overlay;
   wherein a grid overlay is provided for each tanker;
   said grid overlay is superimposed on the tank surface;
   wherein the grid overlay can be viewed at a remote facility.

2. The apparatus as described in claim 1, wherein the software analyzes the color of the tank lining.

3. The apparatus as described in claim 1, wherein the software analyzes the shape of the area of the tank lining.

4. The apparatus as described in claim 1, wherein the software analyzes the size of possible areas of corrosion of the tank lining.

5. The apparatus as described in claim 1 wherein a grid overlay of the entire tank surface is provided.

6. The apparatus as described in claim 1 wherein a plurality of cameras is used.

7. A method for automatic corrosion and detection via video capture, which is comprised of the following steps:
   a. providing a camera;
   said camera is mounted on a portal;
   wherein the camera captures images of a tank surface as it passes through a portal;
   wherein the captured images are displayed at a remote facility;
   b. providing software;
   said software is configured with a predetermined number of preset characteristics for corrosion;
   wherein the software analyzes certain surface characteristics of the tank surface provided by the camera images;
   said software produces a detection result;
   c. producing a histogram;
   wherein a histogram is produced from the analysis that is performed by the video image and the software;
   said histogram presents the tank liner characteristics in a linear format;
   wherein the histogram is viewed by an operator at a remote facility;
   d. producing a grid overlay;
   wherein a grid overlay is provided for each tanker;
   said grid overlay is superimposed on the tank surface;
   wherein the grid overlay can be viewed at a remote facility.

8. The method as described in claim 7, wherein the software analyzes the color of the tank lining.

9. The method as described in claim 7, wherein the software analyzes the shape of the area of the tank lining.

10. The method as described in claim 7, wherein the software analyzes the size of possible areas of corrosion of the tank lining.

11. The method as described in claim 7 wherein a grid overlay of the entire tank surface is provided.

12. The method as described in claim 7 wherein a plurality of cameras is used.

* * * * *